US012769483B2

(12) United States Patent
Yang et al.

(10) Patent No.: US 12,769,483 B2
(45) Date of Patent: Oct. 20, 2026

(54) DATA STORAGE DEVICE WITH DIRECTIONAL DATA TRAFFIC MANAGEMENT

(71) Applicant: Microchip Technology Incorporated, Chandler, AZ (US)

(72) Inventors: Nian Niles Yang, Mountain View, CA (US); Pitamber Shukla, San Jose, CA (US); Hichem Belhadj Mohamed, Loomis, CA (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 18/976,854

(22) Filed: Dec. 11, 2024

(65) Prior Publication Data

US 2026/0099274 A1 Apr. 9, 2026

Related U.S. Application Data

(60) Provisional application No. 63/703,328, filed on Oct. 4, 2024.

(51) Int. Cl.
*G06F 3/06* (2006.01)

(52) U.S. Cl.
CPC .......... *G06F 3/0659* (2013.01); *G06F 3/0625* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 11,720,715 | B2 | 8/2023 | Segev et al. | |
| 2011/0041005 | A1 | 2/2011 | Selinger | |
| 2012/0072677 | A1* | 3/2012 | Biswas | G06F 13/18 711/149 |
| 2012/0144261 | A1 | 6/2012 | Hong et al. | |
| 2017/0271030 | A1 | 9/2017 | Li | |
| 2019/0155759 | A1* | 5/2019 | Connolly | G06F 13/1642 |
| 2023/0251795 | A1 | 8/2023 | Disegni et al. | |

FOREIGN PATENT DOCUMENTS

| | | |
|---|---|---|
| CN | 118550469 A | 8/2024 |

OTHER PUBLICATIONS

International Search Report and Written Opinion for PCT Application No. PCT/US2024/059498 (Dated May 20, 2025).

* cited by examiner

*Primary Examiner* — Brian R Peugh
(74) *Attorney, Agent, or Firm* — Hovey Willams LLP

(57) ABSTRACT

A data storage device with directional traffic management that includes a non-volatile memory media configured to store data and a controller. The controller includes a dedicated read interface, a dedicated write interface, non-transitory computer readable media and at least one processor. When executed by at least one processor, the instructions cause the at least one processor to receive from a host a read request at the dedicated read interface and fulfill the read request using the dedicated read interface to retrieve corresponding requested data from the non-volatile memory media and send the requested data to the host, and receive from the host a write request at the dedicated write interface for corresponding provided data and fulfill the write request using the dedicated write interface to send the provided data to the non-volatile memory media.

20 Claims, 3 Drawing Sheets

DATA STORAGE DEVICE WITH DIRECTIONAL DATA TRAFFIC MANAGEMENT

RELATED APPLICATION

The present U.S. non-provisional patent application is related to and claims priority benefit of an earlier-filed U.S. provisional patent application titled "Data Storage Device with Directional Data Traffic Management," Ser. No. 63/703,328, filed Oct. 4, 2024. The entire content of the identified earlier-filed application is incorporated by reference as if fully set forth herein.

FIELD

The present disclosure relates to data storage devices and methods of implementing them, and more particularly, the various examples described herein concern a data storage device with directional traffic management, and a method of employing directional traffic management in a data storage device.

BACKGROUND

Data storage devices (DSDs), such as solid-state drives (SSDs), use non-volatile memory (NVM) media (e.g., NAND-based memory media) for data storage, and typically include application-specific integrated circuit (ASIC) controllers for managing read, write, and other operations. DSDs are typically used in enterprise computing data center solutions (DCS) and certain high-performance computing (HPC) applications, including artificial intelligence (AI). It is generally desirable to improve the performance and reduce the cost of DSDs, but it can be difficult to do so.

This background discussion is intended to provide related information, and is not necessarily prior art.

SUMMARY

Examples provide a DSD with directional traffic management that includes a controller, and a method of employing directional traffic management in a DSD. Broadly, the controller may include separate, dedicated interfaces: a dedicated read interface for receiving and fulfilling read requests, and a dedicated write interface for receiving and fulfilling write requests. Examples advantageously allow for receiving and fulfilling requests to read and write data in parallel, and advantageously increase efficiency, reduce latency, improve the accuracy of end-user data expectation, and improve performance.

In an example, a DSD is provided with directional traffic management that includes a non-volatile memory media configured to store data and a controller. The controller includes a dedicated read interface, a dedicated write interface, non-transitory computer readable media and at least one processor. When executed by at least one processor, the instructions cause the at least one processor to receive from a host a read request at the dedicated read interface and fulfill the read request using the dedicated read interface to retrieve corresponding requested data from the non-volatile memory media and send the requested data to the host, and receive from the host a write request at the dedicated write interface for corresponding provided data and fulfill the write request using the dedicated write interface to send the provided data to the non-volatile memory media.

In another example, a DSD with directional traffic management may include an NVM media and a controller. The NVM media may be configured to store data. The controller may include a dedicated read interface to manage a plurality of read requests from a host to read requested data from the NVM media, and a dedicated write interface to manage a plurality of write requests from the host to write provided data to the NVM media. The controller may be configured to perform functions including receiving from the host a particular read request of the plurality of read requests at the read interface for the requested data and fulfilling the particular read request using the read interface to retrieve the requested data from the NVM media and send the requested data to the host. The controller functions may also include receiving from the host a particular write request of the plurality of write requests at the write interface for the provided data and fulfilling the write request using the write interface to send the provided data to the NVM.

Either of the preceding examples may further include any one or more of the following features. The DSD may be an SSD, and the NVM media may be a NAND-based memory media. The particular read request may be specifically directed by the host to the dedicated read interface, and the particular write request may be specifically directed by the host to the dedicated write interface. Fulfilling the particular read request may include handling addressing for the requested data, reading the requested data from the NVM media, decoding the requested data, descrambling the requested data, extracting protection information from the requested data, and handling security information for the requested data. Fulfilling the particular write request may include buffering the provided data using a direct memory access (DMA) operation, handling protection information for the provided data, handling security information for the provided data, handling scrambling for the provided data, handling addressing for the provided data, and encoding the provided data using error correction code encoding. The controller may fulfill the particular read request using the dedicated read interface and simultaneously fulfill the particular write request using the dedicated write interface. The controller may reduce power to the dedicated read interface when the dedicated read interface is not managing the read request, and may reduce power to the dedicated write interface when the dedicated write interface is not managing the write request, leading to a better dynamic power management and overall lower power consumption. The write request may be fulfilled using a first clock frequency, and the read request may be fulfilled using a second clock frequency which is different from the first clock frequency.

In an example, a method of employing directional traffic management in a DSD may include the operations set forth below. The DSD may include an NVM media configured to store data, and a controller. The controller may include a dedicated read interface to manage a plurality of read requests from a host to read requested data from the NVM media, and a dedicated write interface to manage a plurality of write requests from the host to write provided data to the NVM media. The method may include receiving from the host a particular read request of the plurality of read requests at the read interface for the requested data and fulfilling the particular read request using the read interface to retrieve the requested data from the NVM media and send the requested data to the host. The method may also include receiving from the host a particular write request of the plurality of write requests at the write interface for the provided data and fulfilling the write request using the write interface to send the provided data to the NVM media.

The preceding example may further include any one or more of the following features. The DSD may be an SSD, and the NVM media may be a NAND-based memory media. The particular read request may be specifically directed by the host to the dedicated read interface, and the particular write request may be specifically directed by the host to the dedicated write interface. Fulfilling the particular read request may include handling addressing for the requested data, reading the requested data from the NVM media, decoding the requested data, descrambling the requested data, extracting protection information from the requested data, and handling security information for the requested data. Fulfilling the particular write request may include buffering the provided data using a direct memory access operation, handling protection information for the provided data, handling security information for the provided data, handling scrambling for the provided data, handling addressing for the provided data, and encoding the provided data using error correction code encoding. The particular read request may be fulfilled using the dedicated read interface and simultaneously the particular write request may be fulfilled using the dedicated write interface. The method may further include reducing power to the dedicated read interface when the dedicated read interface is not managing a read request, and reducing power to the dedicated write interface when the dedicated write interface is not managing a write request. The particular write request may be fulfilled using a first clock frequency, and the particular read request may be fulfilled using a second clock frequency which is different from the first clock frequency.

This summary is not intended to identify essential features of the examples, and is not intended to be used to limit the scope of the claims. These and other aspects of the present examples are described below in greater detail.

DRAWINGS

Examples are described in detail below with reference to the attached drawing figures, wherein.

Figure 1:
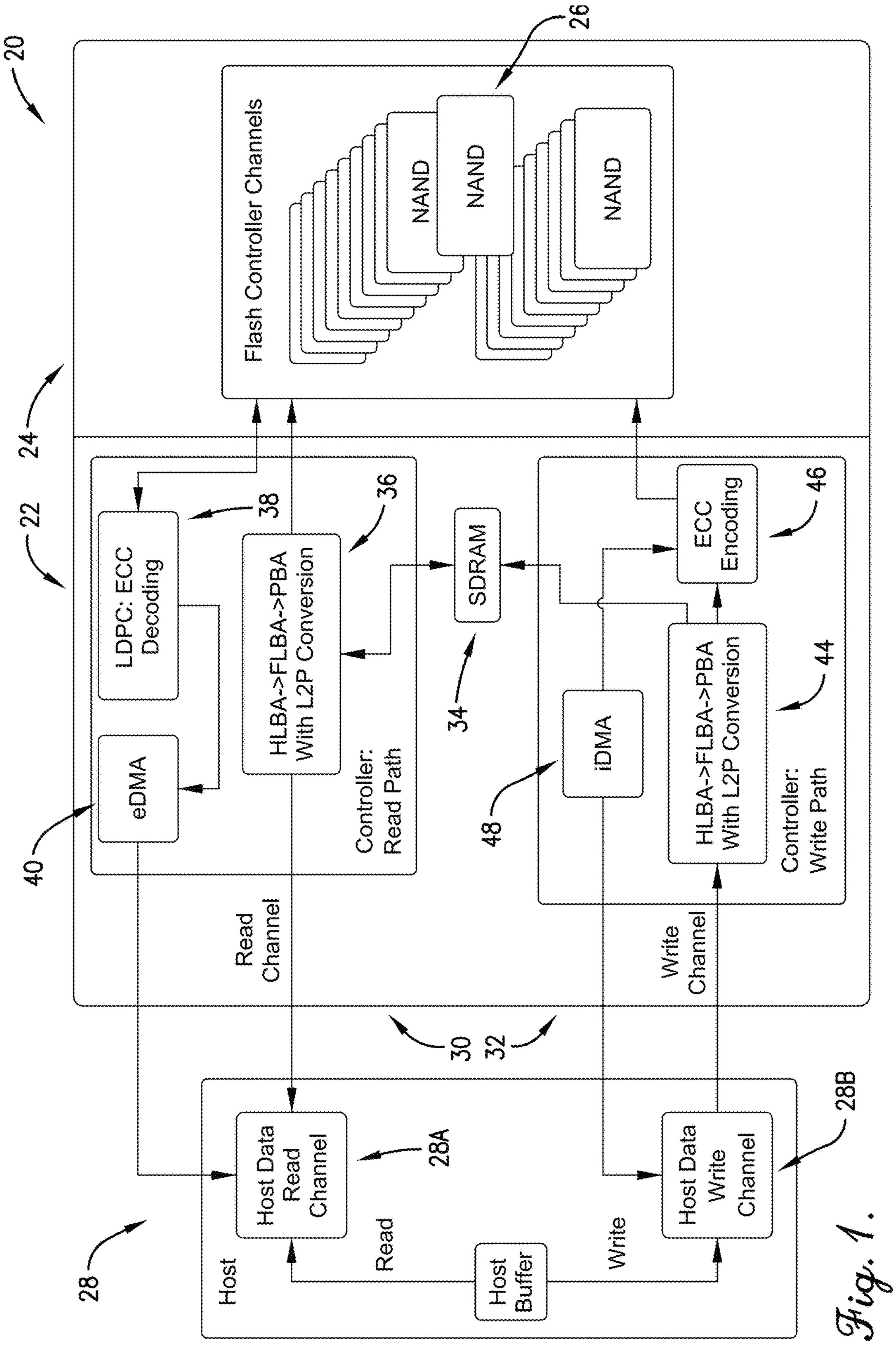
FIG. 1 is a high-level block diagram of components and operations of an example DSD with directional traffic management.

The figures are not intended to limit the examples to the specific details depict. The drawings are not necessarily to scale.

DETAILED DESCRIPTION

In the following detailed description, reference is made to the accompanying drawings, which form a part hereof and in which are shown, by way of illustration, specific examples in which the present disclosure may be practiced. These examples are described in sufficient detail to enable a person of ordinary skill in the art to practice the present disclosure. However, other examples may be utilized, and structural, material, procedural, operational, and other changes may be made without departing from the scope of the disclosure. Unless clearly understood or expressly identified otherwise, structures, materials, procedures, operations, and other aspects described in the context of one example may be incorporated into other examples.

The illustrations presented herein are not meant to be actual views of any particular method, system, device, or structure, but are merely idealized representations that are employed to describe the examples of the present disclosure. The drawings presented herein are not necessarily drawn to scale. Similar structures or components in the various drawings may retain the same or similar numbering for the convenience of the reader; however, any similarity in numbering does not necessarily mean that the structures or components are necessarily identical in size, composition, configuration, or any other property.

Terms of relative location and direction (e.g., above, below, left, right, upper, lower) may be used to facilitate the present descriptions of examples with reference to the figures, but unless clearly understood or expressly identified otherwise, these terms are not meant to be limiting with regard to location, direction, or overall orientation, and may, for example, change as a result of a change in overall orientation.

It will be readily understood that the components of the examples as generally described herein and illustrated in the drawings could be arranged and designed in a wide variety of different configurations. Thus, the following description of various examples is not intended to limit the scope of the present disclosure but is merely representative of various examples.

Data centers employ large numbers of high- and hyper-scale SSDs or other DSDs that are under constant workload fulfilling requests to read and write data. Inefficiency in managing data traffic can lead to increased data access (read or write) latencies and reductions in performance. Conventionally, both read and write traffic is bidirectional through the same interface channels, in an interleaved manner, which creates inefficiency due to access mode switching overhead.

Examples provide a DSD with directional traffic management, and a method of employing directional traffic management in a DSD. Broadly, the controller may include separate, dedicated interfaces: a dedicated read interface for receiving and fulfilling read requests and a dedicated write interface for receiving and fulfilling write requests. Examples advantageously allow for receiving and fulfilling requests to read and write data in parallel, which increases efficiency, reduces latency by acknowledging and thereby freeing the host faster, improves the accuracy of end-user data expectation, and improves performance. With mixed workloads, managing traffic according to the type of data access operation both allows for separately optimizing the performance of each operation and results in the performance of one operation not affecting the performance of the other. Applications include DCS with high- or hyper-capacity SSDs or other DSDs (especially where mixed workloads are dominant), artificial intelligence data processing, and substantially any extended data storage technology with data traffic interfaces.

Referring to FIG. 1, an example of an SSD or other DSD 20 with directional traffic management may include a controller 22 configured to control various DSD operations, such as those discussed below, and an NVM media 24, such as a NAND-based memory media in the form of a plurality of NAND dies 26. The controller 22 may include separate dedicated interfaces: a dedicated "read," or "data-out," interface or egress path 30 for receiving and fulfilling read requests from a host read component 28A, and a dedicated "write," or "data-in," interface or ingress path 32 for receiving and fulfilling write requests from a host write component 28B. Each NAND die 26 may include one or more planes, each plane may include multiple blocks, each block may include multiple sub-blocks, each sub-block may include multiple pages, and each page may include multiple cells. Each block may be arranged as an array of wordlines (WLs) and bitlines (BLs), with each WL representing a page. Although described herein with regard to NAND-based memory media, examples may employ substantially any suitable memory array technology, such as NOR-based memory media and dynamic random access memory (DRAM).

Generally, the DSD 20 may operate as follows. The controller 22 may use logical block addresses (LBAs) and physical block addresses (PBAs) to facilitate access for data storage in and retrieval from the NVM media 24. LBAs are an abstraction to allow the operating system to interact with the NVM media 24, and PBAs represent the actual hardware locations within the NVM media 24. To facilitate interacting with the NVM media 24, the controller 22 may create an entry or record that assigns an LBA to a PBA. To keep track of all such LBA-to-PBA assignments, the controller 22 may use a logical-to-physical (L2P) mapping table. The L2P table may be uploaded to synchronous dynamic random access memory (SDRAM) 34 so that it can be more quickly accessed and updated by the controller 22. For example, when a read request is received, the controller 24 may perform a reference operation 36 to the L2P mapping table to determine the PBA within the NVM media 24 corresponding to a desired LBA. Once the PBA is determined, the controller 22 may access the appropriate NVM cell to read the data. The controller 22 may employ an error correction code (ECC) decoding operation 38 during the decoding of stored data prior to sending it to a host 28. Similarly, when a write request is received, the controller 22 may perform a reference operation 44 to the L2P mapping table to determine the PBA within the NVM media 24 corresponding to a desired LBA. Once the PBA is determined, the controller 22 may access the appropriate NVM cell to write the data. The controller 22 may employ an ECC operation 46 during the encoding of data to detect and correct errors and enhance data integrity prior to sending it to storage. Access to the NVM media 24 may be via a flash physical (PHY) or other suitable interface, and, as discussed below, the dedicated read and write interfaces 30, 32 may each have their own flash PHY interfaces.

A read request may be received by the controller 22 from the host 28 at the dedicated read, or data-out, interface 30. The read request component 28A of the host 28 or of an intermediate traffic management subsystem (not shown) may specifically direct the read request to the dedicated read interface 30. In fulfilling the read request, the read interface 30 of the controller 22 may be used to manage various read-related operations, such as addressing, reading the data read from the NVM media 24, decoding, descrambling, extracting protection information, analyzing or otherwise handling security information, and outputting the data through an enhanced direct memory access (eDMA) operation 40, as shown in 124 of FIG. 2. Additional processing may occur as desired. The requested data may be sent to the host read request component 28A via the dedicated read interface 30 as shown in 126 of FIG. 2.

A write request may be received by the controller 22 from the host 28 at the dedicated write, or data-in, interface 32. The write request component 28B of the host 28 or of an intermediate traffic management subsystem (not shown) may specifically direct the write request to the dedicated write interface 32. In fulfilling the write request, the write interface 32 of the controller 22 may be used to manage various write-related operations, such as data buffering with an internal direct memory access (iDMA) operation, and handling protection information, security information, addressing, scrambling, and error code correction encoding to detect and correct errors and enhance data integrity, as shown in 130 of FIG. 2. Additional processing may occur as desired. The provided data may be written to the NVM media 24 via the dedicated write interface 32 as shown in 132 of FIG. 2.

Because the dedicated read and dedicated write interfaces 30, 32 generally function independently of each other, a read request and a write request from the same host or from different hosts can be serviced simultaneously so long as they involve different NAND dies or different planes within the same NAND die. In various examples, "simultaneous" fulfillment may include performing at least some of the read operation via the dedicated read interface 30 at the same time at least some of the write operation is performed via the dedicated write interface 32. Moreover, these simultaneous operations may be performed at different clock rates or frequencies.

Relatedly, because the interfaces 30, 32 generally function independently of each other, power usage can be optimized by powering-down whichever interface is not in use at a given time. For example, if a read request is received but no write request is received, then the system may power-down or reduce power to the write interface until it is needed. Similarly, if a write request is received but no read request is received, then the system may power-down or reduce power to the read interface until it is needed. Existing protocols, such as CXL/PCIe/SAT interfaces, may be leveraged to facilitate or achieve the desired performance, or, alternatively, any new high-speed protocols may be employed, as desired.

The read and write interfaces 30, 32 may be different (i.e., egress and ingress, respectively) physical layers. Additionally, examples separate the NVM media commands, so the program resume/suspend operation can be used more efficiently for read operations. In particular, the system may be configured to suspend or otherwise delay a write (i.e., program or erase) operation in favor of a read operation when the two operations involve the same plane on a NAND die and therefore use the same BL.

Some or all of the functions of the SSD 20 may be reflected in the operations of the method 120 described below.

Figure 2:
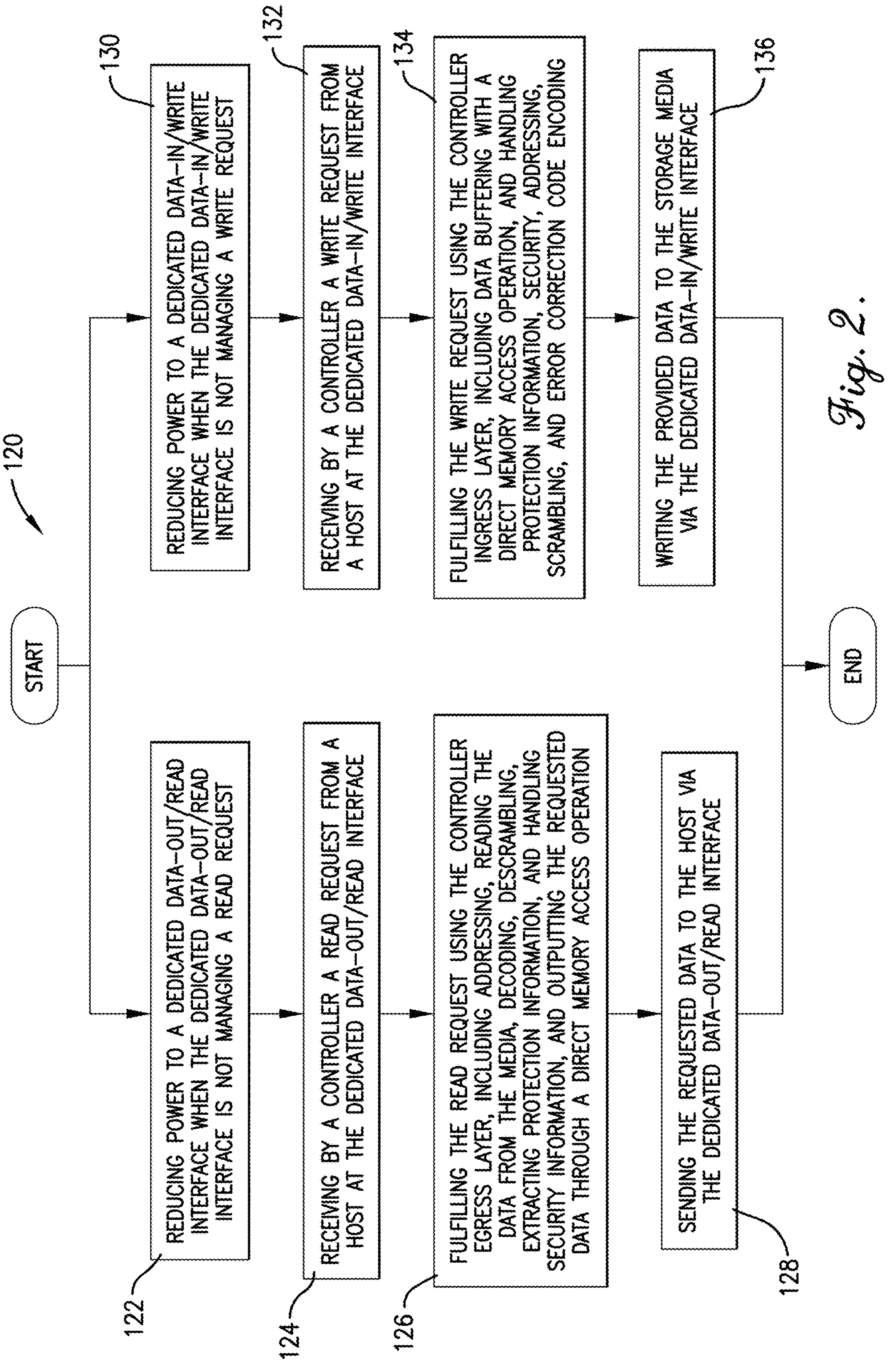
FIG. 2 is a flowchart of operations in an example of a method of employing directional traffic management in a DSD.

Referring to FIG. 2, an example method 120 of employing directional traffic management in an SSD or other DSD, such as the DSD 20 described above, may include the following operations. The DSD 20 may include a controller 22 and a NAND-based or other NVM media 24, and the controller 22 may include separate interfaces: a dedicated "read," or "data-out," interface 30 associated with an egress layer for receiving and fulfilling read requests and a dedicated "write," or "data-in," interface 32 associated with an ingress layer for receiving and fulfilling write requests.

Power to the dedicated read interface 30 may be reduced when the dedicated read interface has not received and is not managing the fulfillment of a read request, as shown in step 122. Power to the dedicated read interface 30 may be reduced when the dedicated read interface has not received and is not managing the fulfillment of a read request, as shown in step 122. A read request may be received by a controller 22 from a host 28 at the dedicated read, or data-out, interface 30, as shown in step 124. A read request component 28A of the host 28 may specifically direct the read request to the dedicated read interface 30. In fulfilling the read request, the read interface 30, or egress layer, of the controller 22 may be used to manage various read-related operations, such as addressing, reading the data read from the NVM media 24, decoding, descrambling, extracting protection information, analyzing or otherwise handling security information, and outputting the data through an enhanced direct memory access (eDMA) operation 40, as shown in 126. Additional processing may occur. The requested data may be sent to the host read request component 28A via the dedicated read interface 30 as shown in 128.

Power to the dedicated write interface may be reduced when the dedicated write interface 32 has not received and is not managing the fulfillment of a write request, as shown in 130. A write request may be received by the controller 22 from the host 28 at the dedicated read, or data-out, interface 32, as shown in step 132. A request component 28B of the host 28 may specifically direct the write request to the dedicated write interface 32. In fulfilling the write request, an ingress layer of the controller 22 may be used to manage various write-related operations, such as data buffering with an internal direct memory access (iDMA) operation 48, and handling protection information, security information, addressing, scrambling, and error code correction encoding, as shown in 134. Additional processing may occur. The provided data may be written to the NVM media 24 via the dedicated write interface 32 as shown in 136.

Because the dedicated read and dedicated write interfaces 30, 32 generally function independent of each other, a read request and a write request from the same host or from different hosts can be serviced simultaneously so long as they involve different NAND dies or different planes within the same NAND die. Relatedly, because the interfaces 30, 32 generally function independently of each other, power usage can be optimized by powering-down or reducing power to whichever interface is not in use at a given time. For example, if a read request is received but no write request is received, then the system may power-down the write interface until it is needed. Alternatively, power to the write interface may be reduced, or the clocking of the write interface may be slowed down if dynamic clock scaling is available. Similarly, if a write request is received but no read request is received, then the system may power-down the read interface until it is needed. Alternatively, power to the read interface may be reduced, or the clocking of the read interface may be slowed down if dynamic clock scaling is available.

Some or all of the operations of the method 120 may be reflected in the functions of the DSD 20 described above.

Figure 3:
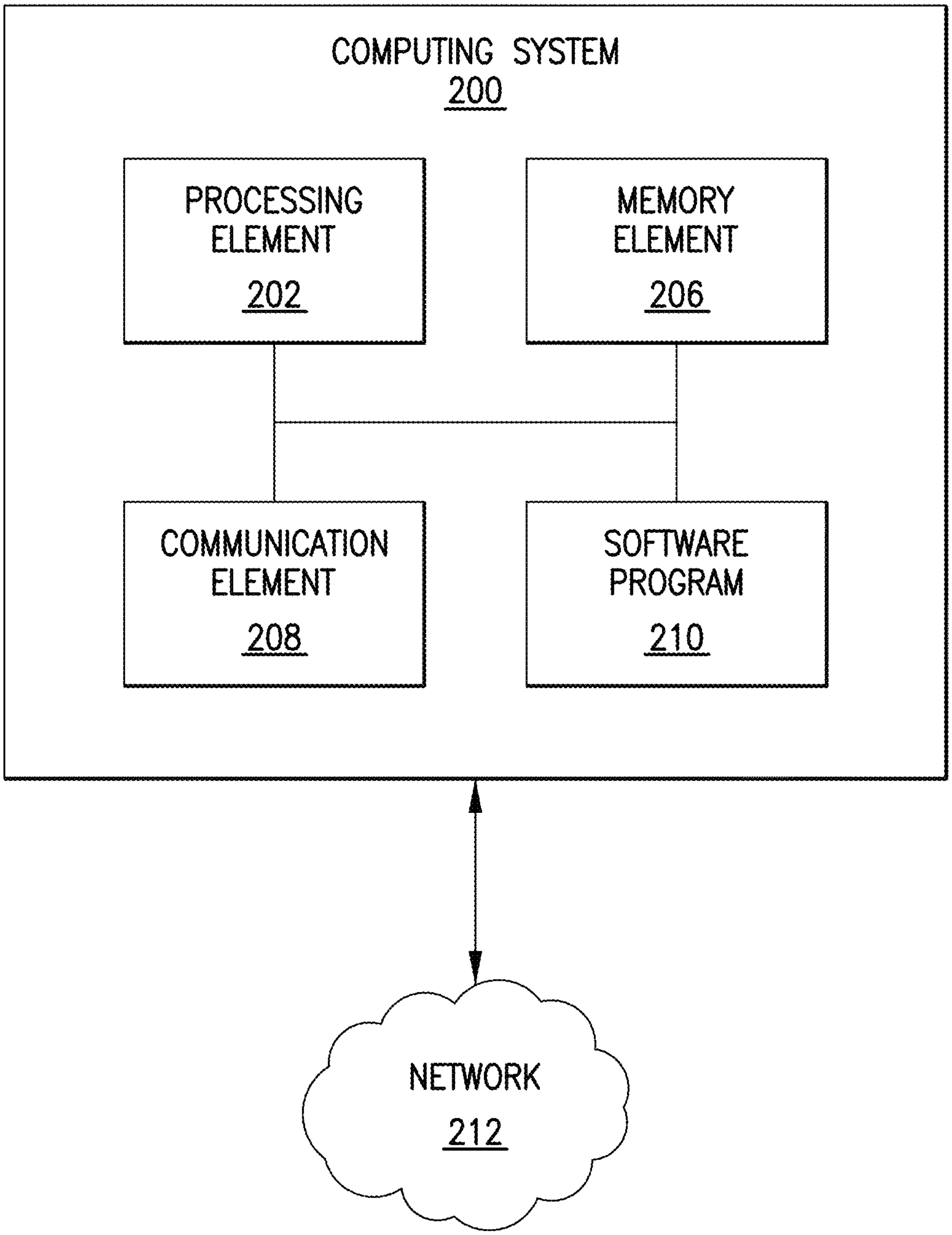
FIG. 3 illustrates an example computing system of the system of FIG. 1 connected to a communication network.

FIG. 3 illustrates a computing system 200 connected to a communication network 212. The computing system 200 may include at least one processing element 202, at least one memory element 206, a communication element 208, and a software program 210. In various examples, the computing system 200 may be a DSD system (e.g., the DSD 20 of FIG. 1), without limitation.

The software program 210 may be configured with instructions for performing and/or enabling performance of at least some of the steps set forth herein. In an embodiment, the software program 210 comprises instructions stored on computer-readable media of memory element 206. In various examples, the software program 210 may include instructions for performing operations of the controller 22 discussed with reference to FIG. 1. In various examples, the software program 210 may include instructions for performing operations of the method 120 of FIG. 2.

The communication network 212 generally allows communication between the computing system 200 and another computing device, such as between a remote host system (not shown), and a data storage system (e.g., the DSD 20 of FIG. 1), without limitation.

The communication network 212 may include the Internet, cellular communication networks, local area networks, metro area networks, wide area networks, cloud networks, plain old telephone service (POTS) networks, and the like, or combinations thereof. The communication network 212 may be wired, wireless, or combinations thereof and may include components such as modems, gateways, switches, routers, hubs, access points, repeaters, towers, and the like. The computing system 200 may, for example, connect to the communication network 212 either through wires, such as electrical cables or fiber optic cables, or wirelessly, such as RF communication using wireless standards such as cellular 2G, 3G, 4G or 5G, Institute of Electrical and Electronics Engineers (IEEE) 802.11 standards such as WiFi, IEEE 802.16 standards such as WiMAX, Bluetooth™, or combinations thereof.

The communication element 208 generally allows communication between the computing system 200 and the communication network 212. The communication element 208 may include signal or data transmitting and receiving circuits, such as antennas, amplifiers, filters, mixers, oscillators, digital signal processors (DSPs), and the like. The communication element 208 may establish communication wirelessly by utilizing radio frequency (RF) signals and/or data that comply with communication standards such as cellular 2G, 3G, 4G or 5G, Institute of Electrical and Electronics Engineers (IEEE) 802.11 standard, such as WiFi, IEEE 802.16 standard, such as WiMAX, Bluetooth™, or combinations thereof. In addition, the communication element 208 may utilize communication standards such as ANT, ANT+, Bluetooth™ low energy (BLE), the industrial, scientific, and medical (ISM) band at 2.4 gigahertz (GHz), or the like. Alternatively, or in addition, the communication element 208 may establish communication through connectors or couplers that receive metal conductor wires or cables, like Cat 6 or coax cable, which are compatible with networking technologies such as ethernet. In certain embodiments, the communication element 208 may also couple with optical fiber cables. The communication element 208 may respectively be in communication with the processing element 202 and/or the memory element 206.

The memory element 206 may include electronic hardware data storage components such as read-only memory (ROM), programmable ROM, erasable programmable ROM, random-access memory (RAM) such as static RAM (SRAM) or dynamic RAM (DRAM), solid state drives (SSDs), cache memory, hard disks, floppy disks, optical disks, flash memory, thumb drives, universal serial bus (USB) drives, or the like, or combinations thereof. In some embodiments, the memory element 206 may be embedded in, or packaged in the same package as, the processing element 202. The memory element 206 may include, or may constitute, a "computer-readable medium." The memory element 206 may store the instructions, code, code segments, software, firmware, programs, applications, apps, services, daemons, or the like that are executed by the processing element 202. In an embodiment, the memory element 206 respectively store the software program 210. The memory element 206 may also store settings, data, documents, sound files, photographs, movies, images, databases, and the like. In various examples, the memory element 206 may include a first memory component for storing firmware of the controller 22 of FIG. 1 and a second memory component comprising one or more NVM media 24 of FIG. 1, without limitation.

The processing element 202 may include electronic hardware components such as processors. The processing element 202 may include digital processing unit(s). The processing element 202 may include microprocessors (single-core and multi-core), microcontrollers, digital signal processors (DSPs), field-programmable gate arrays (FPGAs), analog and/or digital application-specific integrated circuits (ASICs), or the like, or combinations thereof. The processing element 202 may generally execute, process, or run instructions, code, code segments, software, firmware, programs, applications, apps, processes, services, daemons, or the like. For instance, the processing element 202 may execute the software program 210. The processing element 202 may also include hardware components such as finite-state machines, sequential and combinational logic, and other electronic circuits that can perform the functions necessary for the operation of the current disclosure. The processing element 202 may be in communication with the other electronic components through serial or parallel links that include universal busses, address busses, data busses, control lines, and the like.

Through hardware, software, firmware, or various combinations thereof, the processing element 202 may—alone or in combination with other processing elements—be configured to perform the operations of embodiments of the present disclosure. The embodiments described herein in connection with the attached drawing figures are intended to describe aspects of the disclosure in sufficient detail to enable those skilled in the art to practice the disclosure. Other embodiments can be utilized and changes can be made without departing from the scope of the present disclosure. The system may include additional, less, or alternate functionality and/or device(s), including those discussed elsewhere herein. In addition, features from one example may be combined with features of another example while still being encompassed within the scope of the disclosure as contemplated by the inventors. The above detailed description is, therefore, not to be taken in a limiting sense. The scope of the present disclosure is defined only by the appended claims, along with the full scope of equivalents to which such claims are entitled, unless otherwise expressly stated and/or readily apparent to those skilled in the art from the description.

The invention claimed is:

1. A data storage device with directional traffic management, the data storage device comprising:

non-transitory computer readable media having instructions stored thereon and including non-volatile memory media configured to store data; and a controller including a dedicated read interface, a dedicated write interface, and at least one processor, wherein the instructions, when executed by the at least one processor, cause the at least one processor to— receive from a host a read request directly at the dedicated read interface, wherein the read request is specifically directed by the host to the dedicated read interface, fulfill the read request using the dedicated read interface to retrieve corresponding requested data from the non-volatile memory media and send the requested data to the host, receive from the host a write request directly at the dedicated write interface for corresponding provided data, wherein the write request is specifically directed by the host to the dedicated write interface, and fulfill the write request using the dedicated write interface to send the provided data to the non-volatile memory media, wherein when the read request is concurrently received with the write request, the instructions, when executed by the at least one processor, cause the at least one processor to fulfill the read request using the dedicated read interface simultaneously with fulfilling the write request using the dedicated write interface.

2. The data storage device of claim 1, wherein the data storage device is a solid-state drive.

3. The data storage device of claim 1, wherein fulfilling the read request includes— handling addressing for the requested data;

reading the requested data from the non-volatile memory media;

decoding the requested data;

descrambling the requested data;

extracting protection information from the requested data;

handling security information for the requested data.

4. The data storage device of claim 1, wherein fulfilling the write request includes— buffering the provided data using a direct memory access operation;

handling protection information for the provided data;

handling security information for the provided data;

handling scrambling for the provided data;

handling addressing for the provided data;

encoding the provided data using error correction code encoding.

5. The data storage drive of claim 1, wherein the instructions, when executed by the at least one processor, cause the at least one processor to reduce power to the dedicated read interface when the dedicated read interface is not managing the read request, and to reduce power to the dedicated write interface when the dedicated write interface is not managing the write request.

6. The data storage drive of claim 1, wherein the write request is fulfilled using a first clock frequency, and the read request is fulfilled using a second clock frequency which is different from the first clock frequency.

7. The data storage device of claim 1, wherein when the read request is fulfilled simultaneously with fulfilling the write request, the read request involves a first plane of the non-volatile memory media and the write request involves a different second plane of the non-volatile memory media.

8. The data storage device of claim 1, wherein the read request is received from a first host and the write request is received from a different second host.

9. A solid-state drive with directional traffic management, the data storage device comprising:

a NAND-based memory media configured to store data; and a controller including— a dedicated read interface to manage a plurality of read requests received directly from a host to read requested data from the NAND-based memory media, wherein the controller reduces power to the dedicated read interface when the dedicated read interface is not managing the plurality of read requests, and a dedicated write interface to manage a plurality of write requests received directly from the host to write provided data to the NAND-based memory media, wherein the controller reduces power to the dedicated write interface when the dedicated write interface is not managing the plurality of write requests, and the controller being configured to— receive from the host a particular read request of the plurality of read requests directly at the dedicated read interface for the requested data, fulfill the particular read request using the dedicated read interface to retrieve the requested data from the NAND-based memory media and send the requested data to the host, receive from the host a particular write request of the plurality of write requests directly at the dedicated write interface for the provided data, and fulfill the particular write request using the dedicated write interface to send the provided data to the NAND-based memory media, wherein when the particular read request is concurrently received with the particular write request, the controller fulfills the particular read request using the dedicated read interface and simultaneously fulfills the particular write request using the dedicated write interface.

10. The solid-state drive of claim 9, wherein— fulfilling the particular read request includes— handling addressing for the requested data, reading the requested data from the NAND-based memory media, decoding the requested data, descrambling the requested data, extracting protection information from the requested data, and handling security information for the requested data; and fulfilling the particular write request includes— buffering the provided data using an internal direct memory access operation, handling protection information for the provided data, handling security information for the provided data, handling scrambling for the provided data, handling addressing for the provided data, and encoding the provided data using error correction code encoding.

11. The solid-state drive of claim 9, wherein when the particular read request is fulfilled simultaneously with fulfilling the particular write request, the particular read request involves a first plane of the non-volatile memory media and the particular write request involves a different second plane of the non-volatile memory media.

12. The solid-state drive of claim 9, wherein the particular read request is received from a first host and the particular write request is received from a different second host.

13. A method of employing directional traffic management in a data storage device including non-volatile memory media and a controller, the method comprising— receiving, at a dedicated read interface of the controller and directly from a host, a particular read request of a plurality of read requests, the particular read request being for requested data, wherein the particular read request is specifically directed by the host to the dedicated read interface;

fulfilling the particular read request using the dedicated read interface to retrieve the requested data from the non-volatile memory media and send the requested data to the host;

receiving, at a dedicated write interface of the controller and directly from the host, a particular write request of a plurality of write requests, the particular write request being for provided data, wherein the particular write request is specifically directed by the host to the dedicated write interface; and fulfilling the particular write request using the dedicated write interface to send the provided data to the non-volatile memory media, wherein when the particular read request is concurrently received with the particular write request, the controller fulfills the particular read request using the dedicated read interface and simultaneously fulfills the particular write request using the dedicated write interface.

14. The method of claim 13, wherein— the data storage device is a solid-state drive; and the non-volatile memory media is a NAND-based memory media.

15. The method of claim 13, wherein fulfilling the read request includes— handling addressing for the requested data;

reading the requested data from the non-volatile memory media;

decoding the requested data;

descrambling the requested data;

extracting protection information from the requested data;

handling security information for the requested data.

16. The method of claim 13, wherein fulfilling the write request includes— buffering the provided data using a direct memory access operation;

handling protection information for the provided data;

handling security information for the provided data;

handling scrambling for the provided data;

handling addressing for the provided data;

encoding the provided data using error correction code encoding.

17. The method of claim 13, further including reducing power to the dedicated read interface when the dedicated read interface has not received and is not fulfilling a read request of the plurality of read requests, and reducing power to the dedicated write interface when the dedicated write interface has not received and is not managing a write request of the plurality of write requests.

18. The method of claim 13, wherein the particular write request is fulfilled using a first clock frequency, and the particular read request is fulfilled using a second clock frequency which is different from the first clock frequency.

19. The method of claim 13, wherein when the particular read request is fulfilled simultaneously with fulfilling the particular write request, the particular read request involves a first plane of the non-volatile memory media and the particular write request involves a different second plane of the non-volatile memory media.

20. The method of claim 13, wherein the particular read request is received from a first host and the particular write request is received from a different second host.

* * * * *